US006655743B1

(12) United States Patent
Parizat et al.

(10) Patent No.: US 6,655,743 B1
(45) Date of Patent: Dec. 2, 2003

(54) ELECTRONICALLY CONTROLLED SEAT BELT MODULE

(75) Inventors: Amnon Parizat, Old Westbury, NY (US); Marek Tarczynski, New York, NY (US)

(73) Assignee: Island Pyrochemical Industries Corp., Mineola, NY (US)

( * ) Notice: Subject to any disclaimer, the term of this patent is extended or adjusted under 35 U.S.C. 154(b) by 9 days.

(21) Appl. No.: 10/120,466

(22) Filed: Apr. 11, 2002

(51) Int. Cl.[7] ...................... A62B 35/04; B60R 22/343; B60R 22/405; B60R 22/46
(52) U.S. Cl. ...................... 297/477; 297/474; 297/475; 297/476; 297/478; 242/379.1; 242/381; 242/382; 242/390.9; 242/396
(58) Field of Search .............................. 242/381, 390.8, 242/390.9, 396, 379.1, 382; 297/477, 474, 475, 476, 478

(56) References Cited
U.S. PATENT DOCUMENTS 4,815,674 A * 3/1989 Blake et al. ............ 242/381 X
6,481,659 B1 * 11/2002 Ashtiani et al. .......... 242/379.1
2003/0094533 A1 * 5/2003 Specht et al. ............ 242/379.1

* cited by examiner

*Primary Examiner*—Rodney B. White
(74) *Attorney, Agent, or Firm*—Francis C. Hand; Carella, Byrne, Bain et al.

(57) ABSTRACT

The seat belt module is electronically controlled using magneto-rheological fluid. A CPU delivers a signal to an electromagnetic coil within the module at the beginning of a crash to cause the viscosity of the magneto-rheological fluid to increase sufficient to lock the spool on which the seat belt is wound against rotation. Thereafter, a subsequent signal is delivered by the CPU to the coil to reduce the magnetic field and the viscosity of the magneto-rheological fluid allowing the spool to be unwound in a programmed manner so as to reduce the forces imposed on an occupant by the seat belt. The CPU may be pre-programmed in response to signals from sensors throughout the vehicle that deliver signals corresponding to the characteristics of the occupant and may be programmed in response to signals from these sensors and from an air bag to respond in real time.

15 Claims, 8 Drawing Sheets

ELECTRONICALLY CONTROLLED SEAT BELT MODULE

This invention relates to an electronically controlled seat belt module. More particularly, this invention relates to an electronically controlled seat belt module for a restraint system in a vehicle.

As is known, vehicles, particularly passenger vehicles, are provided with various types of restraint devices in order to reduce the risk of injury to an occupant in the event that the vehicle crashes into another object. These devices include seat belts, such as three point belts, two point belts and the like, to restrain an occupant in a seat during a crash and air bags to cushion an occupant against the effects of a crash.

Typically, a seat belt assembly is constructed with a spool on which a webbing is wound and from which the webbing may be unwound in order to be placed across the lap and/or chest of a seated occupant. In addition, a retractor is provided in order to rewind the webbing onto the spool when the seat belt is not in use. The seat belt assembly is also constructed to lock in place when a crash is sensed in order to anchor the occupant to the seat. That is to say, the seat belt becomes locked so as to restrain a forward movement of the occupant.

In some cases, pretensioners and load limiters have been employed with the seat belt assembly to reduce unnecessary seat belt slack and to maintain the belt force in the webbing at a controlled and pre-defined level. The limiting of the seat belt tension has been accomplished by a mechanism in the retractor of the seat belt assembly that allows the webbing of the seat belt assembly to be pulled out slightly and in a controlled way if the load on an occupant's body becomes too high in a violent crash. This mechanism has been used in combination with an air bag.

In one known load limiter, a bar is used to hold a spindle on which the spool of webbing is mounted in place. When the force on the webbing exceeds a pre-set limit, usually 4 kN, the end of the bar will turn thereby twisting the bar and spool allowing the webbing to be played out thereby gradually reducing the load on the occupant's chest.

A similar principle has been used for load limiters that operate in two steps. Such a two-stage system is intended to give a high and relatively even load on the occupant's chest during the whole crash.

Air bag constructions have also been known, such as described in U.S. Pat. No. 6,036,226, wherein the inflation rate of the air bag is capable of modulation.

As is known, the detrimental effects of a vehicle crashing into another object occurs over a very limited amount of time, typically measured in milliseconds. Accordingly, restraint systems, such as seat belts and air bags, have a very limited time within which to react and deploy.

Further, in many cases, the design and construction of seat belts and air bags have been based upon standards developed from the results obtained in experimental crashes performed with dummies placed in a vehicle. Typically, these standards have been based upon an "average" occupant seated in a particular position. Accordingly, in actual vehicle crashes, occupants having quite different characteristics from the "average" occupant and seated in different manners from the standard seating position, may have forces imposed thereon by the seat belts and air bags that actually harm the occupant.

Accordingly, it is an object of the invention to program a seat belt assembly to react to the forces that are generated during a vehicle crash.

It is another object of the invention to be able to program a seat belt assembly during a crash in a manner to reduce the risk of injury to an occupant.

It is another object of the invention to be able to program a seat belt assembly to respond to the characteristics of a seated occupant during a crash.

Briefly, the invention is directed to a seat belt assembly for an occupant of a vehicle that is typically used with an air bag.

The seat belt assembly includes an electronically controlled seat belt module that is mounted in the vehicle, a buckle receiving unit of conventional type for anchoring one end of a seat belt about an occupant seated in the vehicle and a central processing unit (CPU) that is operatively connected to the module to operate the module.

The electronically controlled seat belt module includes a shaft, a spool that is rotatably mounted concentrically of the shaft for winding of a seat belt thereon, a plurality of poles mounted on the shaft and a plurality of poles mounted on the spool in alternating relation with the poles on the shaft. In addition, a magneto-rheological fluid (M-R fluid) is disposed between the poles of the shaft and the spool and an electromagnetic coil is mounted between the shaft and spool to create a magnetic field passing through the poles and fluid upon actuation of the electromagnetic coil.

The central processing unit is operatively connected to the electromagnetic coil of the module for delivering a programmed electric current over time to the electromagnetic coil. For example, at the onset of a crash, the CPU delivers an electric current over time to the coil to create a magnetic field that is sufficient to have the M-R fluid initially lock the spool against rotation relative to the shaft. Subsequently, the CPU delivers a reduced electric current over time to the coil to release the spool at a specific rate and profile in order to minimize the belt load on the occupant during a crash.

The seat belt assembly may be constructed so that in the event a pre-crash event is detected by a sensor in the vehicle or an actual crash is sensed by a sensor in the vehicle, a signal is delivered to the CPU that, in turn, is programmed to respond by first delivering a signal to the module to tension the seat belt to eliminate slack in the belt. For example, the CPU delivers a signal to an electric rewind motor in the module to rewind the spool. In this respect, the central processing unit delivers a specific current for tension or load limitation profile to the motor. The tension force and load limitation force may be variable and can depend on occupant classification, driving speed and crash sensor. These data are processed by the central processing unit and used to control the seat belt module.

After tensioning of a seat belt has reached a maximum force, the seat belt spool is electronically locked via a second signal forwarded by the CPU to the coil in the module.

As the kinetic energy of the occupant in an emergency situation begins to generate a load on the locked seat belt, belt forces on the chest and abdomen of the occupant increase rapidly and are sensed by a seat belt tension sensor of conventional construction. When the belt forces reach a maximum allowed limit, a signal is emitted to the CPU which, in turn, delivers a responsive signal to the coil in the module in order to reduce the strength of the magnetic field on the M-R fluid. As a result, the seat belt spool is released from a locked condition and allowed to rotate at a specific rate and profile to unwind the seat belt and thereby gradually reduce the belt load on the chest and abdomen of the occupant.

Typically, the response time for the CPU to lock the spool or to release the spool at the required profile is 5 to 10 milliseconds. This allows the electronically controlled seat belt module to deliver a safer and gradual absorbing energy to the occupant and a controlled interface with an air bag that is being deployed to cushion the occupant.

In accordance with the invention, the maximum belt force limits are variable and determined by the CPU and are dependent on occupant classification, crash severity, occupant position and air bag deployment profile.

The module can also operate in a simpler mode utilizing preprogrammed information collected during vehicle crash research. In that mode, the module would utilize information from a reduced number of sensors. For instance, information from an occupant weight sensor and/or crash severity sensor may be sufficient to select the appropriate current profile. Other combinations of sensors providing information to the module are also possible.

The module may be constructed with a spool that is mounted on a fixed shaft and that can be driven by a motor. Alternatively, the module may be constructed with a spool mounted on a rotatable shaft which, in turn, is driven by a motor.

In still other embodiments, the module may be constructed to cooperate with a pretensioner in which case a motor may not be required. In these embodiments, the shaft may be fixed or rotatable.

In still other embodiments, the module may be constructed with the poles disposed concentrically of the shaft and spool or disposed perpendicularly of the shaft and spool.

These and other objects and advantages of the invention will become more apparent from the following detailed description taken in conjunction with the accompanying drawings wherein.

Figure 1:
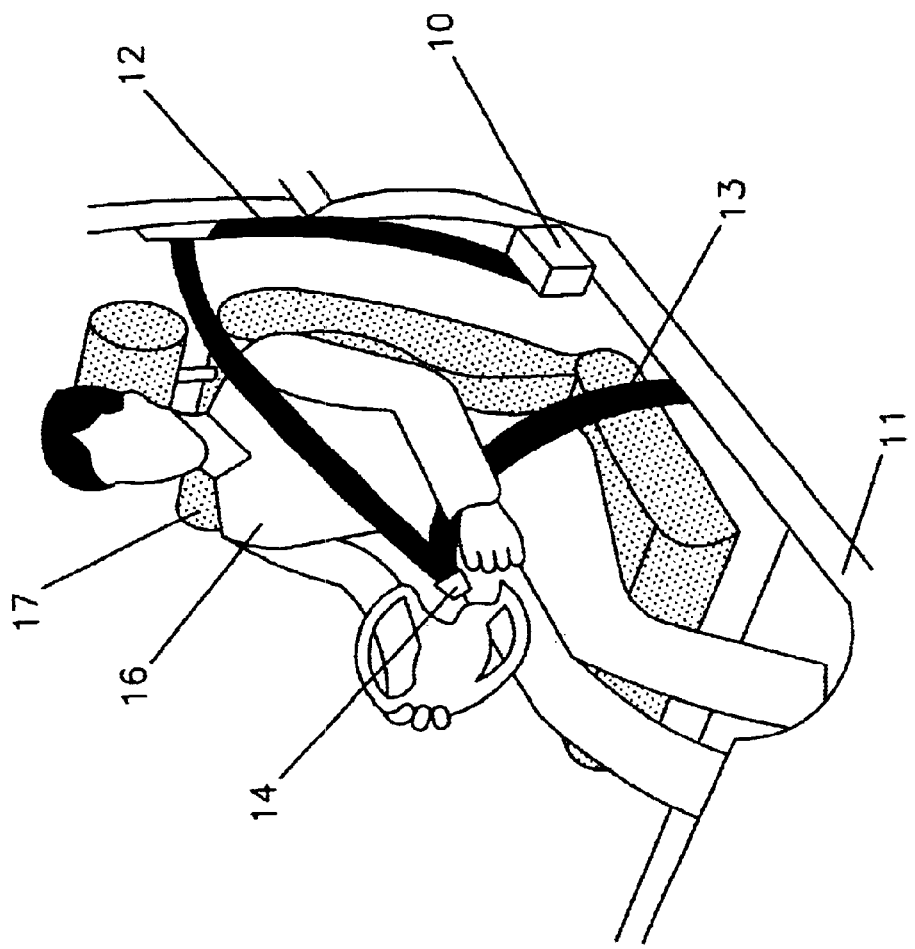
FIG. 1 illustrates a perspective view of an occupant seated in a vehicle and restrained by a three-point seat belt assembly.

Referring to FIG. 1, the electronically controlled seat belt module 10 is employed in a passenger vehicle 11, for example, with a three point seat belt assembly 12. As illustrated, the three point seat belt assembly 12 includes a seat belt 13 that is anchored at one end to the vehicle 11 in known manner and is wound on the module 10 at the opposite end. In addition, the assembly 12 includes a buckle 14 that is slidably mounted on the seat belt 13 and a buckle receiving unit 15 that is anchored to the vehicle 11 in known manner to receive the buckle 14. When in use, the seat belt 13 lies across the lap and across the chest of an occupant 16 seated on a seat 17 in the vehicle 11. The three point seat belt assembly 12 is of conventional structure and need not be further described.

The electronically controlled seat belt module 10 may be used with other types of seat assemblies. For example, the module 10 may be used with a shoulder belt or with a lap belt or with a harness. Also, a pair of modules may be used, for example, one module may be used with a lap belt while a second module is used with a shoulder belt of a seat belt assembly.

The electronically controlled seat belt module 10 may be mounted on the seat or may be mounted in the frame of the vehicle 11 as shown.

Figure 2:
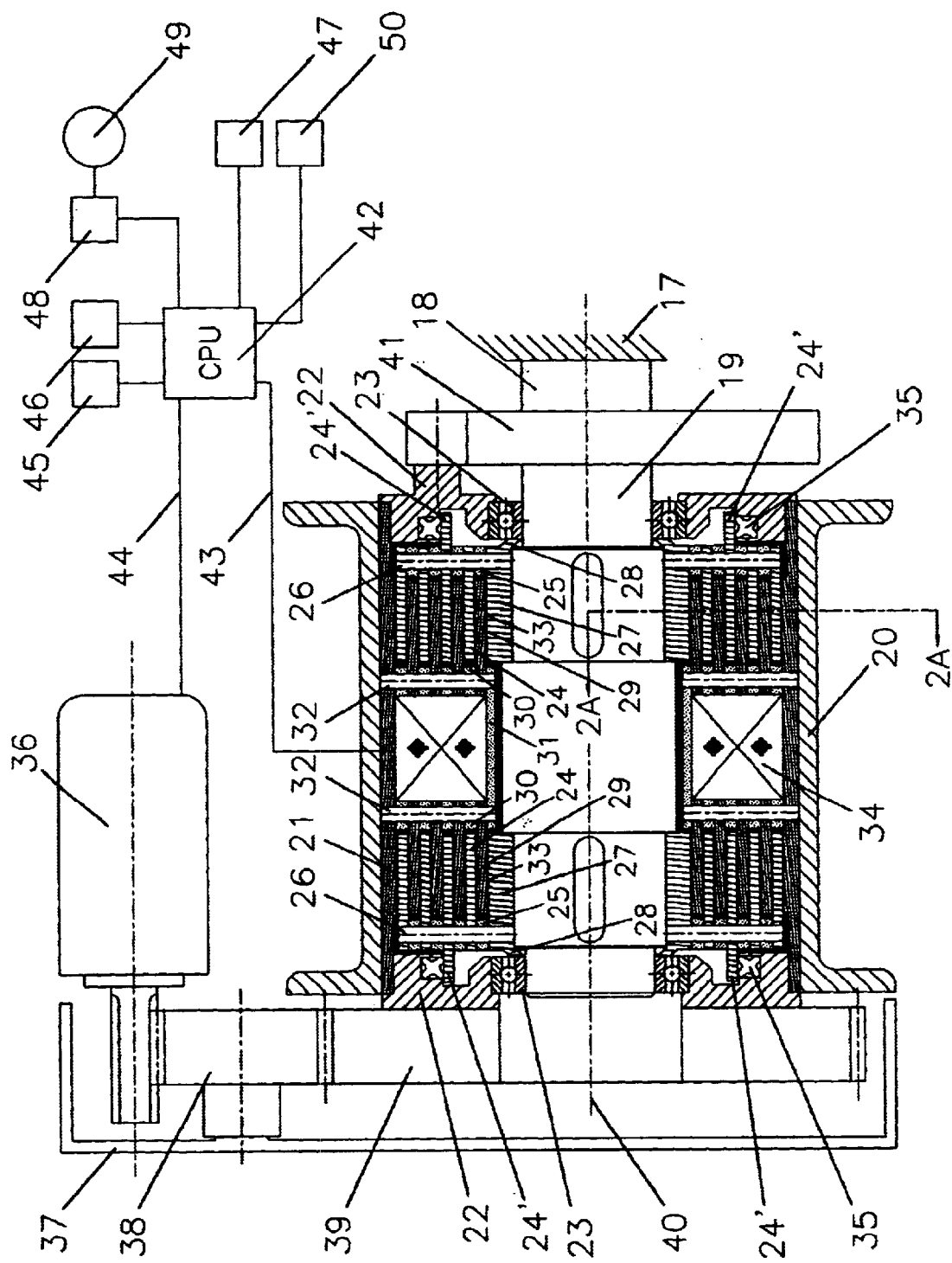
FIG. 2 illustrates a part cross-sectional view of the module of FIG. 1 and a schematic of a connection between the CPU and the module in accordance with the invention.

Referring to FIG. 2, the seat belt module 10 includes a post 18 or other mounting means that can be secured in place within the seat 17 or the frame of the vehicle 11, for example, by welding, bolting or the like. In addition, the module 10 includes a fixed stepped shaft 19 that is secured to the post 18 and a spool 20 that is rotatably mounted on the shaft 19 for winding of the seat belt (not shown) thereon. The shaft 19 may also be supported at the opposite end in the frame of the vehicle 11.

As illustrated, the spool 20 is mounted on a sleeve 21 that, in turn, receives a pair of annular plates 22. The spool 20, sleeve 21 and plates 22 are secured together as by bolts (not shown). Each annular plate 22 is mounted via a ball bearing 23 on the fixed shaft 19.

A plurality of poles 24 of magnetic material, e.g. four poles, are mounted on each lateral side of the shaft 19 and are disposed in spaced apart parallel manner to the axis of the shaft 19. The poles 24 may be integral with the shaft 19 or, as shown, are made as separate rings that are separated by spacers 25 and secured by a common bolt or pin 26 to a sleeve 27 secured on the respective side of the shaft 19. Each sleeve 27 also has a sealing lip 28 that engages an inner race of an adjacent ball bearing 23.

In a similar fashion, a plurality of poles 29 of magnetic material are mounted on opposite sides of the spool 20 and are disposed in alternating parallel relation with the poles 24 of the shaft 19. As indicated, the poles 29 of each set of poles are spaced apart by spacers 30 and are held in place by an inner sleeve 31 and a bolt or pin 32 that is secured between the inner sleeve 31 and the sleeve 21 on which the spool 19 is mounted.

Figure 2A:
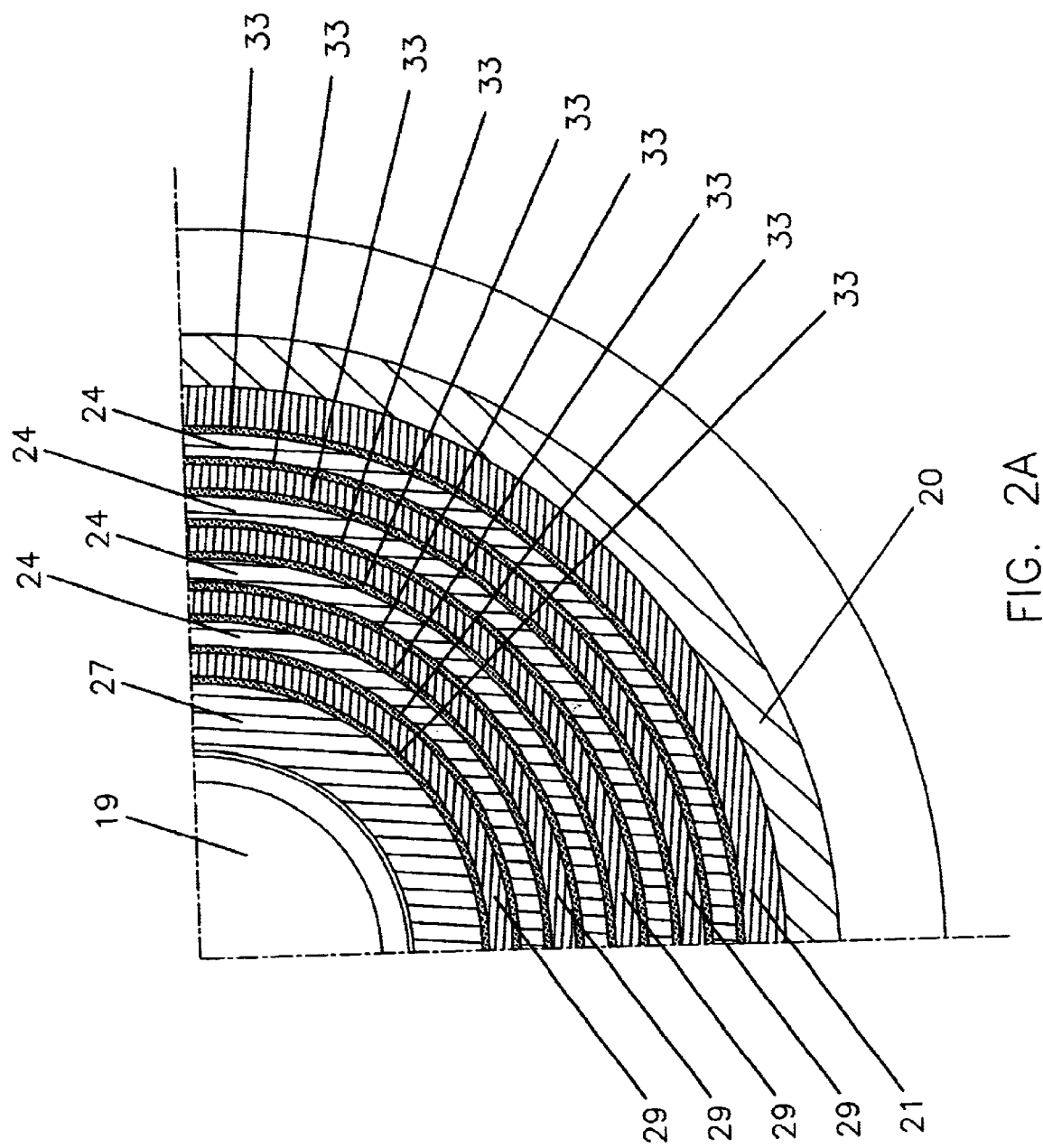
FIG. 2A illustrates a cross-sectional view taken on line 2A—2A of FIG. 2.

In addition, as indicated in FIGS. 2 and 2A, the module 10 includes a magneto-rheological fluid 33 that is disposed between adjacent poles 24, 29 as well as in the gaps where the respective poles 24, 29 are spaced from the shaft 19 and spool 20. The magneto-rheological fluid (M-R fluid) 33 is made of any suitable material, such as carbonyl iron particles suspended in silicone oil as described in U.S. Pat. No. 5,284,330, that has a viscosity that can be controlled by a magnetic field.

An electromagnetic coil 34 of annular shape is mounted on the shaft 19 between the two sets of poles 24,29 and between the sleeves 21,31.

As shown, an intermediate one of the poles 24' extends outwardly into a recess of a respective annular plate 22 and an annular seal 35, such as an O-ring, is provided between the pole 24' and the plate 22 in order to seal against leakage of the M-R fluid 33.

The module 10 also includes an electric motor 36 that is mounted on a gear box 37 and operatively connected via a gear 38 to a drive gear 39 that is secured to one of the plates 22 in order to rotate the spool 20 around the axis 40 of the shaft 19.

A rewind spring 41 is mounted on an opposite side of the shaft 19 from the motor 36 and is operatively connected to the plate 22 on that side in order to rewind the spool 20 in a conventional manner.

A central processing unit (CPU) 42 is operatively connected to the coil 34 via a suitable line 43 as well as to the electric motor 36 via a line 44. In addition, a plurality of the sensors 45, 46, 47, 48 that are disposed throughout the vehicle (not shown) are operatively connected to the CPU 42 to deliver signals thereto.

The sensors 45, 46, 47, 48 are employed to deliver information to the CPU 42 indicative of various characteristics of a seated occupant, the condition of the vehicle and the like. For example, one sensor 45 may be used to deliver a signal to the CPU 42 that indicates that the vehicle is about to impact against an object. A second sensor 46 may be used to deliver a signal to the CPU 42 to indicate the tension or slack in the seat belt after being buckled in place about an occupant. A third sensor 47 may be used to deliver a signal to the CPU 42 that is indicative of the height, weight or position of the seated occupant. A fourth sensor 48 may be employed to show the inflation rate of an air bag 49. A fifth sensor 50 may be employed to show the tension force in the seat belt 13.

In any event, the sensors 45,46,47,48,50 deliver signals to the central processing unit 42 in order that the CPU 42 into one or more modes of operation from a plurality of pre-programmed modes of operation.

For example, in one mode of operation, the CPU 42 delivers a signal via the line 44 to the electric motor 36 in order to cause the motor 36 to wind the spool 20 in a direction to tighten, i.e. tension, the seat belt 13 (See FIG. 1) about the occupant 16 prior to or at the beginning of a crash in order to remove any slack from the seat belt 13.

Thereafter, the CPU 42 delivers a signal over a preset time via the line 43 to the coil 34 in order to create a maximum magnetic field through the poles 24, 29 and M-R fluid 33 to increase the viscosity of the M-R fluid 33 such as to lock the spool 20 against rotation on the shaft 19. This, in turn, locks the occupant 16 to the seat 17.

Next, the CPU 42 delivers a further signal or signals via the line 43 to the coil 34 to reduce the magnetic field through the poles 24, 29 and M-R fluid 33 thereby changing the viscosity of he M-R fluid 33 to a degree that allows the spool 20 to slip or rotate relative to the shaft 19. This allows the seat belt 13 to unwind.

The signals that are delivered by the CPU 42 to the coil 34 are coordinated in the CPU 42 with the signal from the sensor 48 for indicating the inflation rate of the air bag 49 so that the restraining force imposed by the seat belt 13 on the occupant 16 diminishes to a point where the restraining force of the air bag 49 on the occupant takes over and without the forces from the seat belt 13 and air bag 49 becoming cumulatively harmful to the occupant 16.

The CPU 42 may be programmed so that the changes in the viscosity of the M-R fluid 33 and thus the amount the spool 20 is allowed to unwind are carried out in stepwise increments over time or in a continuously decreasing manner over time.

By way of example, the signals delivered by the CPU 42 to the coil 34 may be incremented in 10 millisecond steps. Further, with each step, the signals delivered to the CPU 42 by the sensors 44, 45, 46, 47 may be reassessed so that the ultimate signal delivered via the line 43 to the coil 34 may be progressively changed in real time to reflect actual crash conditions in the vehicle and on the occupant.

A simpler version of the overall system is also possible that does not require all the aforementioned sensors. In the simpler version, the CPU 42 would select the appropriate algorithm based on the information received from a limited number of sensors. For instance, a weight of the occupant sensor and/or a crash severity sensor may be sufficient to select the appropriate current profile from the CPU 42.

The response time of the coil 34 is typically 3 to 5 milliseconds (ms). However, development of the magnetic field in the M-R fluid 33 varies depending on the current profile and may increase the response time to 10 milliseconds (ms).

The M-R fluid 33 response time is typically less than 1 millisecond. That is to say, when a "locking" signal is delivered from the CPU 42 to the coil 34, the spool 20 is locked in less than 5 to 10 milliseconds.

The CPU 42 is operatively connected to the coil 34 for delivering a programmed electric current over time to the coil 34 to initially lock the spool 20 against rotation relative to the shaft 19 and to subsequently release the spool 20 at a specific rate and profile to minimize and gradually reduce the belt load on the occupant 16 during a crash.

Figure 3:
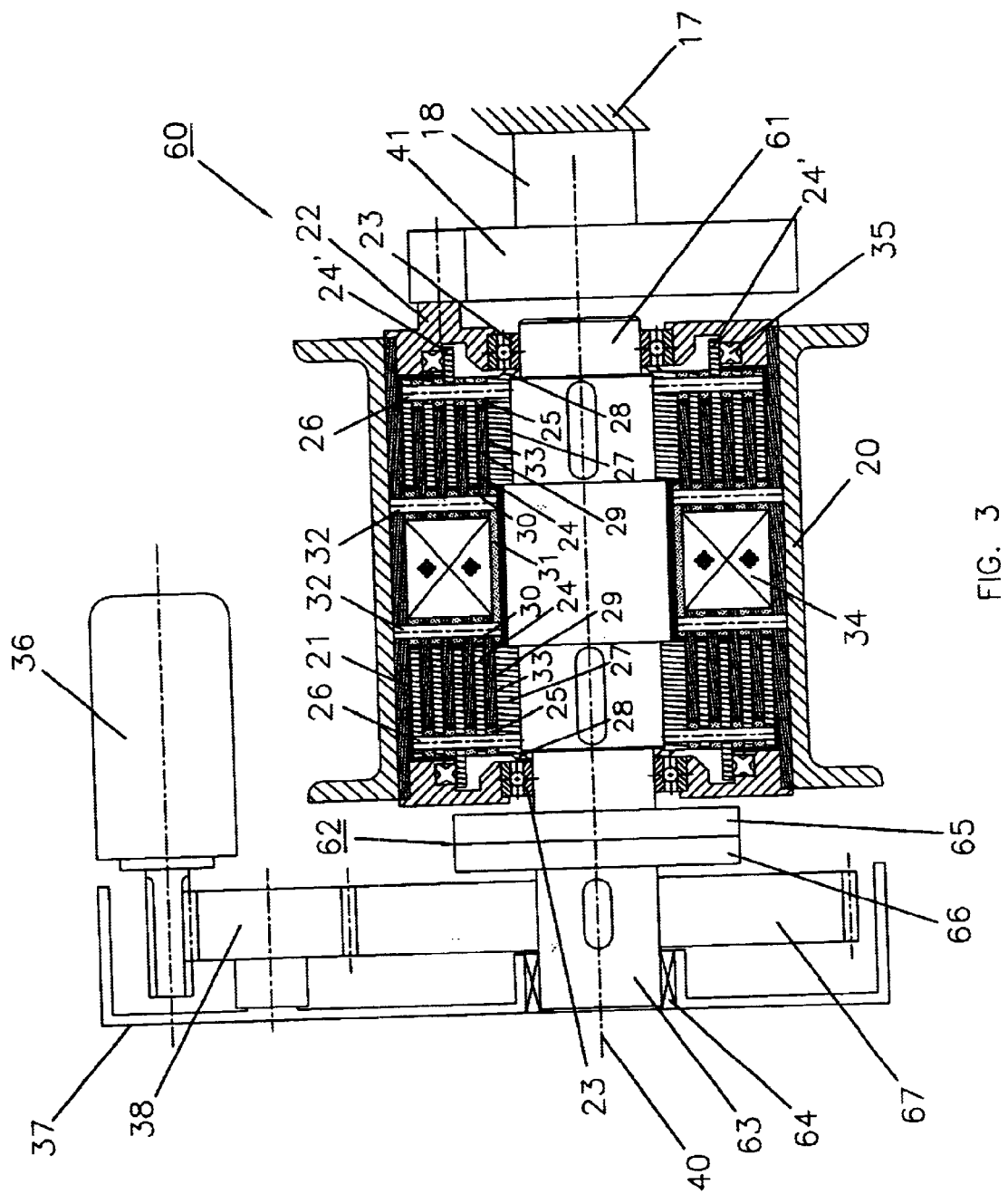
FIG. 3 illustrates a part cross-section view of a modified electronically controlled seat belt module employing a rotatable shaft in accordance with invention.

When a seat belt is unwound from the spool 20 for example, when first being placed about an occupant in the vehicle, the user must exert a sufficient pulling force to overcome the static friction forces existing in the electric motor 36, the gears 38,39 and between the spool 20 and fixed shaft 19 and particularly the M-R fluid 33. In order to minimize the pulling force required, the motor 36 and gears 38,39 of the gear box 37 may be uncoupled from the shaft 19. For example, referring to FIG. 3, wherein like reference characters indicate like parts as above, the module 60 may be constructed with a rotatable shaft 61 as well as a rotatable spool 20.

In this embodiment, the shaft 61 is coupled by way of an inertial clutch 62 to a rotatable stub shaft 63 mounted via a bearing 64 in the gear box 37. As indicated, the clutch 62 has a pair of plates 65, 66 disposed in facing relation. One plate 65 is secured to the shaft 61 and the other plate 66 is secured to the stub shaft 63. In addition, the clutch 62 includes a ratchet mechanism (not shown) for locking the shaft 61 to the stub shaft 63, for example in the event of a crash.

The stub shaft 63 is fixedly secured to a gear 67 which meshes with the gear 38 in the gear box 37 that is driven by the motor 36.

In operation, when the seat belt (not shown) is to be initially placed about an occupant, the clutch 62 is in a state that uncouples the shaft 61 from the gear 67 and the motor 36 remains inactive. Thus, any pulling force on the seat belt causes the spool 20 to rotate in an unwinding direction. At the same time, any drag in the M-R fluid 33, causes the shaft 61 to freely rotate. As a result, the pulling force need only be sufficient to overcome the inertial forces in the fluid 33 and the spool 20.

When the motor 36 is activated, a signal is also sent to the coil 34 to increase the viscosity of the M-R fluid 33 in order to lock the shaft 19 and spool 20 together. As a result, when the motor 36 is activated, the gear 67 and stub shaft 63 are rotated. The gear 67, in turn, drives the clutch plates 66, 65 so that the shaft 61 is rotated. Thus, as above, when a signal is delivered to the motor 36 from the CPU (not shown), the spool 20 is caused to rotate in a direction to take slack out of the seat belt.

Figure 4:
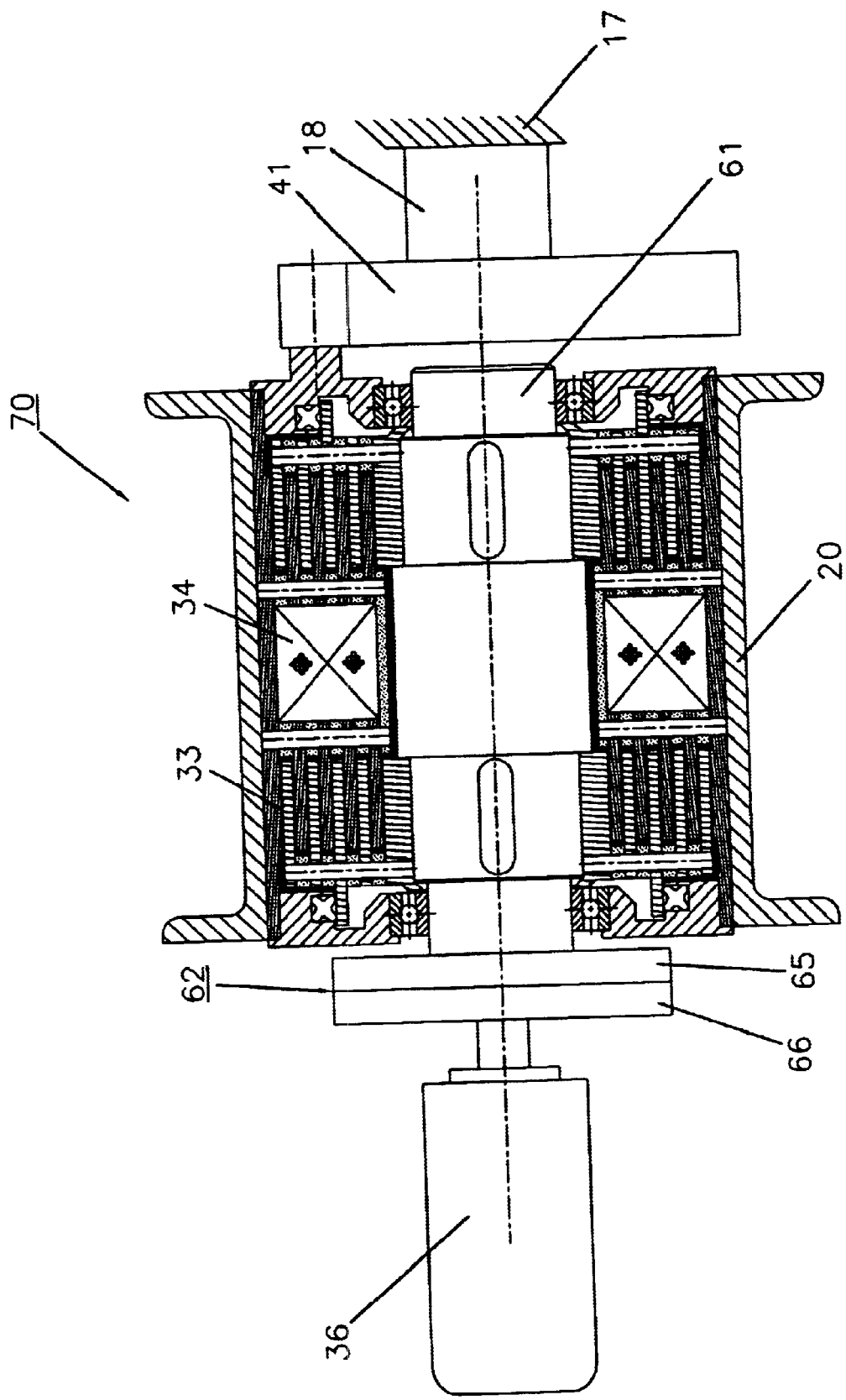
FIG. 4 illustrates a part cross-section view of a modified electronically controlled seat belt module employing a rotatable shaft with a direct drive motor in accordance with invention.

Referring to FIG. 4, wherein like reference characters indicate like parts as above, depending upon the space available on the seat or in the vehicle, the module 70 may be constructed with the electric motor 36 mounted co-axially with the shaft 61. In addition, a clutch 62, as above, may be provided between the motor 36 and the shaft 61 to allow the shaft 61 to rotate during an initial phase of buckling of a seat belt about an occupant.

Figure 5:
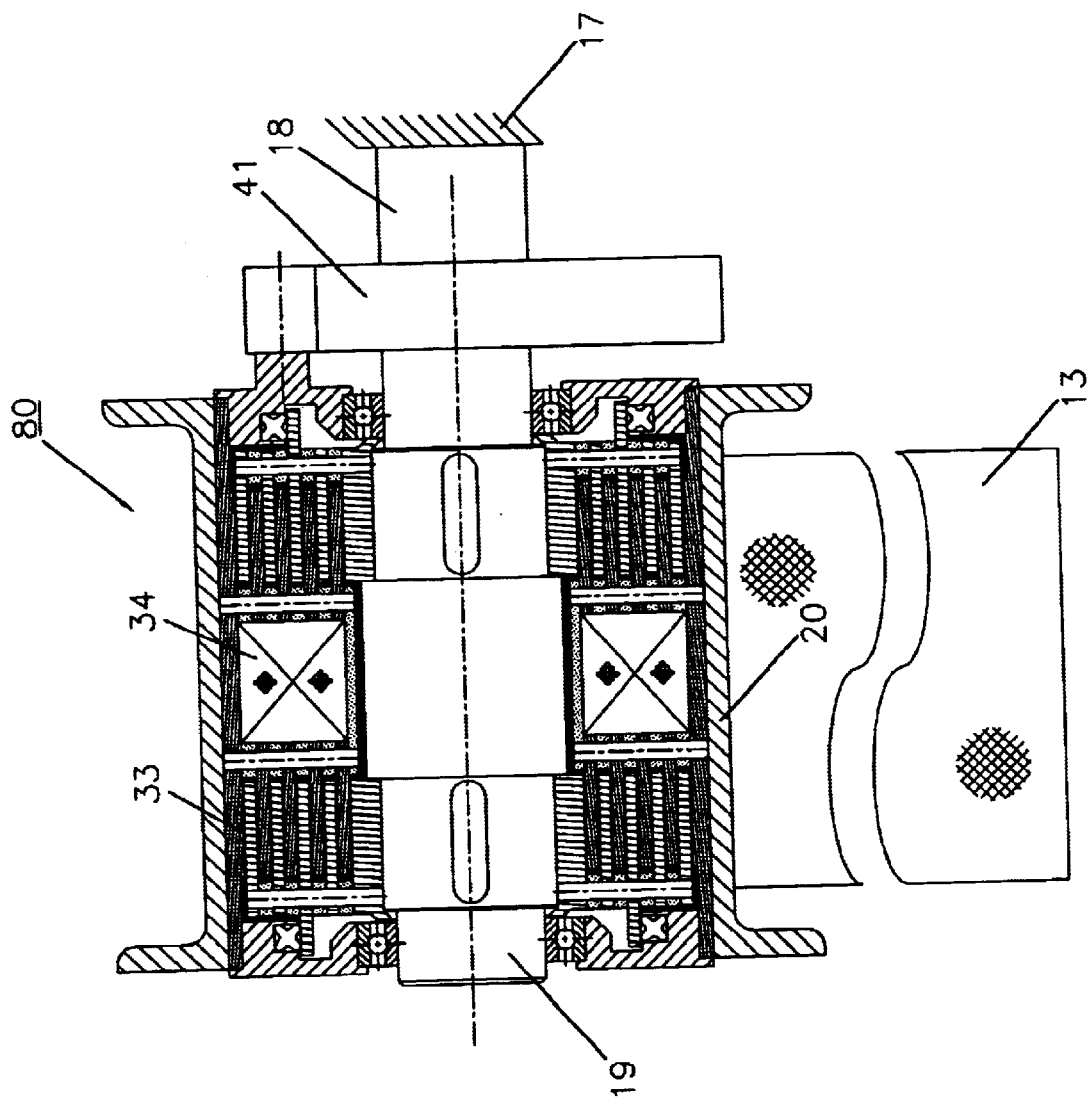
FIG. 5 illustrates a part cross-section view of a modified electronically controlled seat belt module employing a pretensioner in accordance with invention.

Referring to FIG. 5, wherein like reference characters indicate like parts as above, the module 80 may be constructed to cooperate with a pre-tensioner (not shown) that functions to reduce slack in the belt 13 in a manner as described above. In this embodiment, there is no need for a motor 36 as above. The module 80 functions to lock the seat belt 13 upon a current being delivered to the coil 34 and to thereafter reduce the locking force on the belt 13 in a manner as described above.

Figure 6:
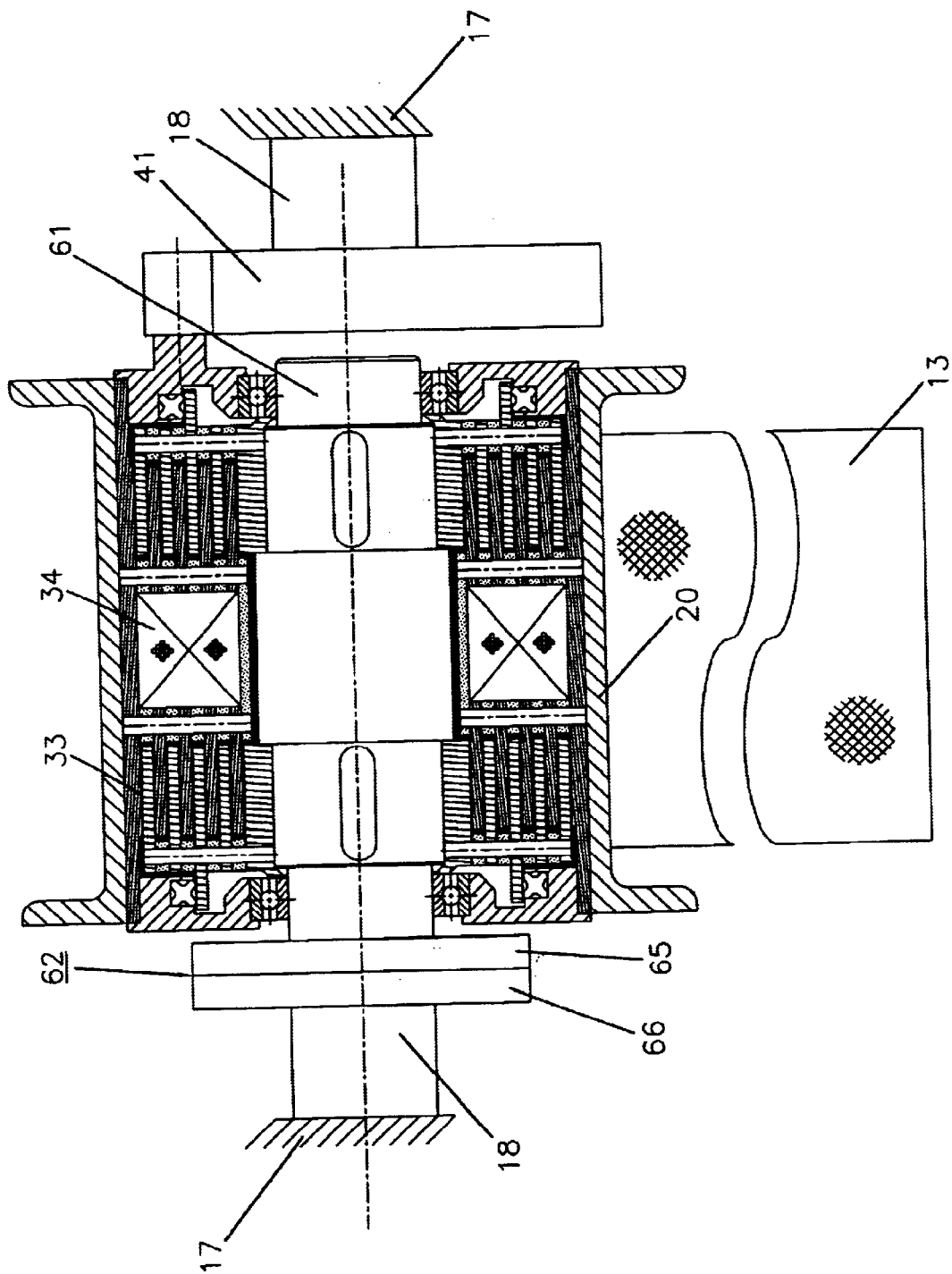
FIG. 6 illustrates a part cross-section view of a modified electronically controlled seat belt module similar to FIG. 5 and employing a rotatable shaft in accordance with invention.

Referring to FIG. 6, wherein like reference characters indicate like parts as above, the module 90 may be constructed in a manner similar to the module 80 in FIG. 5, but with a rotatable shaft 61. In this case, the rotatable shaft 61 is coupled with a clutch 62 having a ratchet mechanism (not shown) therein. As indicated, the clutch 62 is mounted on the frame 17 of the seat or the vehicle.

In operation, when a seat belt 13 is unwound from the spool 20, the clutch 62 allows the shaft 61 to rotate to thereby reduce the pulling force required to unwind the seat belt 13. The ratchet mechanism of the clutch 62 serves to lock the seat belt 13 in place should the speed of unwinding of the belt 13 exceed a predetermined limit.

Figure 7:
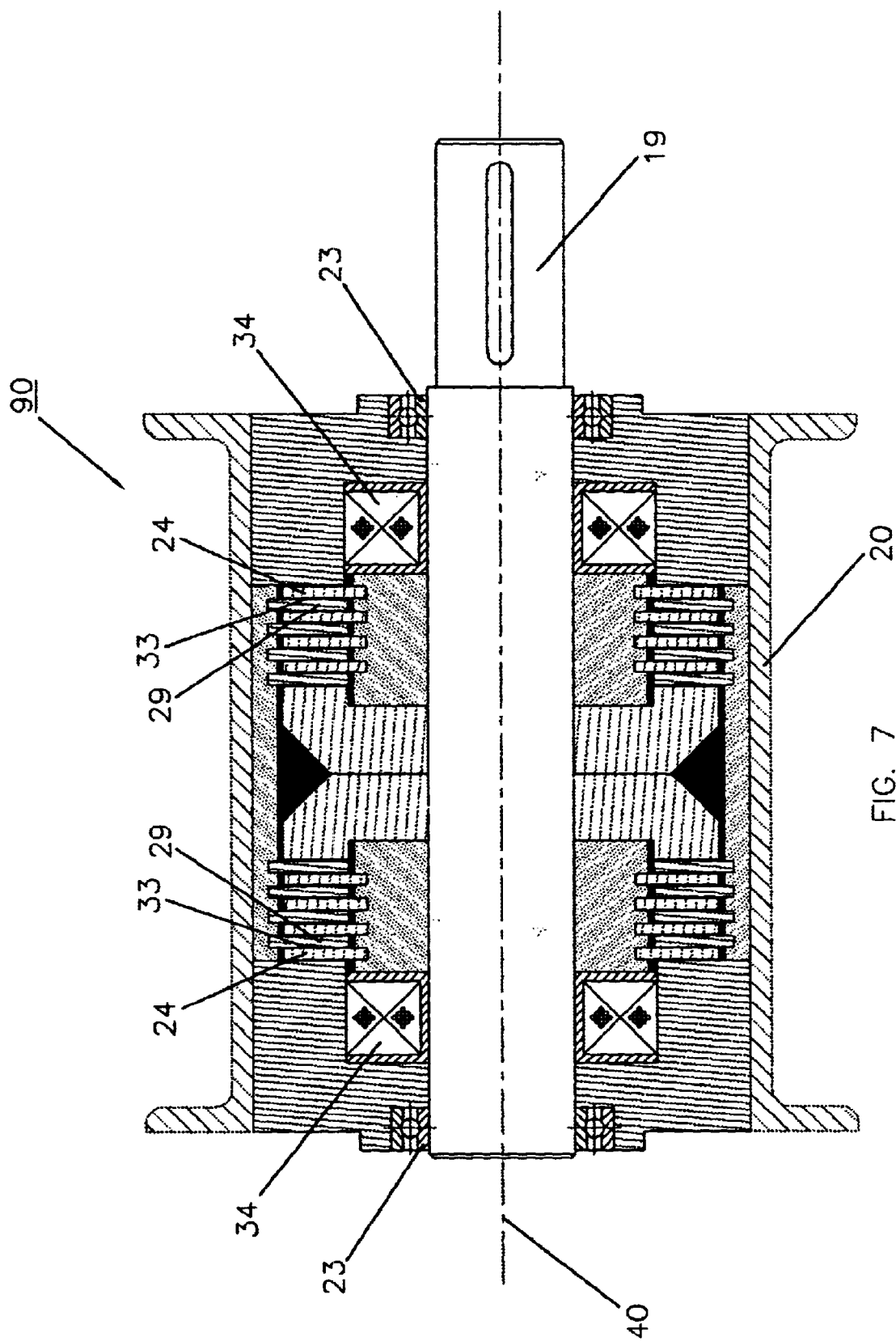
FIG. 7 illustrates a part cross-section view of a modified electronically controlled seat belt module employing poles disposed perpendicularly of the shaft and spool in accordance with invention.

Referring to FIG. 7, wherein like reference characters indicate like parts as above, the module 90 is constructed with the poles 24, 29 mounted perpendicularly of the shaft 19 and spool 20. In this case, the poles 24 mounted on the shaft 19 are in the form of annular plates that are spaced apart by suitable spacers. Likewise, the poles 29 mounted on the spool 20 are in the form of annular plates spaced apart by suitable spacers.

As indicated, two sets of alternating poles 24, 29 are mounted on the shaft 19. Further, a pair of coils 34 are also mounted on the shaft 19. Each coil 34 is associated with one set of poles 24, 29 so as to generate a magnetic field passing through the poles 24, 29 when the coil 34 is energized.

The invention thus provides an electronically controlled seat belt module which is able to respond within a minimum of time, for example within 5 to 10 milliseconds, to adapt the forces of a seat belt on a seated occupant to the forces generated by an inflating air bag on the occupant.

The invention further provides an electronically controlled seat belt module which is able to respond different parameters of a seated occupant and tensions in a seat belt during a crash so as to reduce the risk of injury to the occupant by excessive forces in the seat belt.

The invention further provides an electronically controlled seat belt module that is able to react in real time to forces that are generated by a vehicle crash as the crash proceeds.

What is claimed is:

1. An electronically controlled seat belt module comprising
    a shaft;
    a spool rotatably mounted concentrically of said shaft for winding of a seat belt thereon;
    a first plurality of poles mounted on said shaft;
    a second plurality of poles mounted on said spool in alternating relation with said first plurality of poles;
    a magneto-rheological fluid disposed between adjacent poles of said first and said second plurality of poles; and
    at least one electromagnetic coil mounted between said shaft and said spool to create a magnetic field passing through said poles of said first and said second plurality of poles to change the viscosity of said fluid upon actuation of said coil.

2. An electronically controlled seat belt module as set forth in claim 1 wherein said shaft is stationary.

3. An electronically controlled seat belt module as set forth in claim 1 wherein said poles of first plurality of poles are disposed coaxially of said shaft and said poles of said second plurality of poles are disposed coaxially of said spool.

4. An electronically controlled seat belt module as set forth in claim 1 wherein said coil is annular.

5. An electronically controlled seat belt module as set forth in claim 1 further comprising an electronic motor for rotating said spool about said shaft.

6. An electronically controlled seat belt module as set forth in claim 5 wherein said motor is coaxially disposed relative to said shaft.

7. An electronically controlled seat belt module as set forth in claim 5 further comprising a gear transmission operatively connecting said motor to said shaft and said motor is in spaced parallel relation to said shaft.

8. An electronically controlled seat belt module as set forth in claim 1 further comprising an electronic motor and an inertial clutch operatively connected between said motor and said shaft whereby said clutch allows said motor to drive said shaft and said spool thereon in one direction of rotation and uncouples said shaft from said motor with said shaft rotating in an opposite direction.

9. An electronically controlled seat belt module as set forth in claim 8 wherein said motor is coaxially disposed relative to said shaft.

10. An electronically controlled seat belt module as set forth in claim 1 wherein said poles of first plurality of poles are disposed perpendicularly of said shaft and said poles of said second plurality of poles are disposed perpendicularly of said spool.

11. In combination
    a seat belt assembly for a seated occupant in a vehicle including a seat belt and a buckle on said seat belt for anchoring in a vehicle with said seat belt about the occupant;
    an electronically controlled seat belt module including a shaft, a spool rotatably mounted on said shaft for winding of an end of said seat belt thereon, a first plurality of poles mounted on said shaft, a second plurality of poles mounted on said spool in alternating relation with said first plurality of poles, a magneto-rheological fluid disposed between adjacent poles of said first and said second plurality of poles, and at least one electromagnetic coil mounted between said shaft and said spool to create a magnetic field passing through said poles of said first and said second plurality of poles to change the viscosity of said fluid upon actuation of said coil; and
    a central processing unit operatively connected to said coil for delivering a programmed current over time to said coil to initially lock said spool against rotation relative to said shaft and to subsequently release said spool at a specific rate and profile to allow said belt to unwind from said spool at a rate to minimize the belt load on the occupant during a crash.

12. The combination as set forth in claim 11 which further comprises a pretensioner connected to said seat belt for removing slack in said belt.

13. The combination as set forth in claim 12 wherein said shaft is fixed.

14. The combination as set forth in claim 12 wherein said shaft is rotatable and which further comprises a clutch operatively connected between said rotatable shaft and a fixed point whereby said clutch allows said shaft and said spool thereon to rotate together in one direction of rotation and fixes said shaft against rotation in an opposite direction.

15. An electronically controlled seat belt module comprising
- a shaft;
- a spool disposed concentrically of said shaft;
- a motor for rotating said spool about said shaft for winding of a seatbelt thereon;
- a first plurality of poles mounted on said shaft;
- a second plurality of poles mounted on said spool in alternating relation with said first plurality of poles;
- a magneto-rheological fluid disposed between adjacent poles of said first and said second plurality of poles; and
- at least one electromagnetic coil mounted between said shaft and said spool to create a magnetic field passing through said poles of said first and said second plurality of poles to rigidify said fluid upon actuation of said coil.

* * * * *